United States Patent [19]

Mann

[11] Patent Number: 5,620,752
[45] Date of Patent: Apr. 15, 1997

[54] METHOD AND APPARATUS FOR DRYING SIZED GLASS FIBERS

[75] Inventor: Douglas B. Mann, Pickerington, Ohio

[73] Assignee: Owens-Corning Fiberglass Technology, Inc., Summit, Ill.

[21] Appl. No.: 455,961

[22] Filed: May 31, 1995

[51] Int. Cl.⁶ .................................................. B05D 3/06
[52] U.S. Cl. ............................ 427/541; 34/419; 34/422; 34/246; 118/620; 118/642; 427/177; 427/178; 427/389.8
[58] Field of Search .............................. 34/68, 246, 419, 34/422; 427/389.8, 177, 178, 541; 118/620, 642

[56] References Cited

U.S. PATENT DOCUMENTS

| | | | |
|---|---|---|---|
| 2,491,889 | 12/1949 | Bennett et al. | 49/1 |
| 3,535,588 | 10/1970 | Crook, III | 367/4 |
| 3,615,258 | 10/1971 | Glass | 156/150 X |
| 3,619,252 | 11/1971 | Roscher | 117/66 |
| 3,684,471 | 4/1972 | Matsushita | 65/91 |
| 3,717,448 | 2/1973 | Smith | 118/63 X |
| 4,513,683 | 4/1985 | Kisler | 118/638 X |
| 4,837,943 | 6/1989 | Mizutani | 34/68 X |
| 4,927,445 | 5/1990 | Soszka et al. | 65/11.1 |
| 5,055,119 | 10/1991 | Flault et al. | 65/3.1 |
| 5,152,838 | 10/1992 | Kisler | 427/535 X |
| 5,316,561 | 5/1994 | Roncato et al. | 65/1 |

FOREIGN PATENT DOCUMENTS 1341917  12/1973  United Kingdom .

*Primary Examiner*—Michael Lusignan
*Attorney, Agent, or Firm*—C. Michael Gegenheimer; Inger H. Eckert; Linda S. Evans

[57] ABSTRACT

A method and apparatus is disclosed for producing dried sized glass fibers wherein a drying device is used to produce current flow along sized fibers to thereby partially or fully dry the size on the fibers. The apparatus may include an applicator for applying a size to the fibers and a drying device which comprises a high voltage electrode connected to a high voltage source and at least one grounded electrode. Drying is performed by passing the sized fibers by the electrodes such that a current flows along the sized fibers from the high voltage electrode to the at least one grounded electrode. The grounded electrodes may comprise grounded gathering shoes.

25 Claims, 5 Drawing Sheets

METHOD AND APPARATUS FOR DRYING SIZED GLASS FIBERS

BACKGROUND OF THE INVENTION

The present invention relates in general to continuous glass fiber manufacture and, more particularly, to an improved method and apparatus for drying sized fibers.

Glass fiber packages are commonly manufactured by supplying molten glass to a bushing, drawing glass fibers from the bushing, and applying a size to the fibers by an applicator roller. The sized fibers are gathered into a strand at a gathering shoe and are wound on a collet to produce a glass fiber package. The glass fiber package is then transferred via a carrier device to a heated enclosure, such as an oven, where water is evaporated from the aqueous based size.

However, a migration problem generally exists in the resulting glass fiber packages due to the off-line drying process. Migration occurs during the drying process as water in the aqueous based size travels toward the outer surface of the package. As the water moves outwardly, it takes with it a portion of the soluble solids which becomes deposited at the outer periphery of the package, thus resulting in strands which do not have a uniform mount of sizing solids along their length.

The problem of migration has previously been dealt with by simply removing the high solids fibers from the package. However, this solution results in a substantial amount of scrap and, hence, is not cost-effective.

Other attempts have been made to dry the fibers during an in-line process to improve the uniformity of the handling and subsequent processing of size coated strands. For example, Roscher, U.S. Pat. No. 3,619,252, and Smith, U.S. Pat. No. 3,717,448, teach the use of high frequency dielectric heaters or microwave units to dry wet glass strands before they are subsequently packaged or processed.

Unfortunately, a disadvantage of such dielectric heating methods is that they utilize a varying electrostatic field which results in nonuniform heating and hence drying of the coated fibers.

Accordingly, there is a need for an improved in-line process for drying sized fibers which results in the reduction or substantial elimination of migration, and which provides efficient, uniform heating and drying of the sized fibers.

SUMMARY OF THE INVENTION

This need is met by the methods and apparatus of the present invention wherein sized fibers are dried using a drying device which produces a current flow along the sized fibers to partially or fully dry the fibers. While the present invention generally relates to the manufacture of sized glass fibers, it should be appreciated that the drying device may also be utilized to dry a wide variety of fibers including, for example, graphite fibers, polymer fibers, natural fibers and other types of fibers which are treated with a size. The drying device includes a high voltage electrode connected to a voltage source and at least one grounded electrode. The device may include a second grounded electrode, and if desired, the at least one grounded electrode may comprise a grounded gathering shoe.

The fibers are coated with a size and then dried by passing the fibers by the high voltage electrode and grounded electrode such that current flows along the sized fibers from the high voltage electrode to the grounded electrode. Thus, an electrical current flows along the section of the moving fibers extending between the high voltage electrode and the grounded electrode to dry the fibers by resistance-type heating. The device may utilize either direct or alternating current, although the use of direct current is preferred. The method may be performed in-line and provides a more efficient and uniform method of drying wet glass fibers than prior methods such as dielectric heating.

In accordance with one aspect of the present invention, an apparatus is provided for sizing fibers which includes an applicator for applying a size to fibers; and, a drying device for producing current flow along the sized fibers to generate heat in the fibers and thereby at least partially dry the size on the fibers. The size applied to the fibers preferably comprises a film former selected from the group consisting of a vinyl acrylic copolymer emulsion, a vinyl acetate copolymer emulsion, a polyvinyl acetate copolymer latex, and mixtures thereof.

Preferably, the drying device comprises a high voltage electrode connected to a high voltage source and at least one grounded electrode, whereby current flow is produced along the sized fibers from the high voltage electrode to the at least one grounded electrode. Preferably, the high voltage electrode is spaced from any grounded electrode by at least one inch per 10,000 volts.

In accordance with another aspect of the present invention, a method for sizing fibers is provided comprising the steps of: applying a size to fibers; and, producing current flow along the sized fibers to at least partially dry the size on the fibers. The step of producing current flow along the fibers may comprise the steps of: passing the sized fibers by a first grounded electrode; passing the sized fibers by a high voltage electrode; and, connecting a high voltage source to the high voltage electrode. The method may further comprise the step of passing the sized fibers by a second grounded electrode.

In an alternative embodiment, the method may comprise the step of contacting the sized fibers with the first grounded electrode and/or with the second grounded electrode.

In accordance with yet another aspect of the present invention, an apparatus for producing sized fibers comprises a source of continuous fibers and a drawing device adapted to draw the continuous fibers from the source. An applicator is provided for applying a size to the fibers. A drying device produces a current flow along the sized fibers to dry the fibers. The drying device may comprise a high voltage electrode connected to a high voltage source and at least one grounded electrode, whereby current flow is produced along the sized fibers from the high voltage electrode to the at least one grounded electrode. Preferably, the high voltage source is a direct current source and the current flow is direct current. The high voltage source preferably supplies a voltage of from 5 to 50 kilovolts. Preferably, the high voltage electrode is spaced from any grounded electrode by at least one inch per 10,000 volts. In one embodiment, the fibers are in contact with the grounded electrode.

In an alternative embodiment of the invention, the drying device comprises two grounded electrodes with the high voltage electrode positioned therebetween.

In yet another alternative embodiment, the grounded electrode comprises a grounded gathering shoe. The gathering shoe may be located between the applicator and the drying device. Alternatively, the gathering shoe may be located between the drying device and the drawing device.

In accordance with a further aspect of the present invention, an apparatus for producing at least partially dried sized fibers comprises a source of continuous fibers which have had a size applied thereto. A drawing device provides for drawing the continuous sized fibers from the source. A drying device produces a current along the continuous sized fibers to thereby at least partially dry the fibers.

In accordance with still another aspect of the invention, a method for producing a plurality of sized glass fibers comprises the steps of: drawing glass fibers from a source of molten glass; applying a size to the fibers to form sized fibers; and, drying the sized fibers by passing a current along the sized fibers to dry the size on the fibers. The step of drying the fibers may further comprise the steps of: passing the sized fibers by a first grounded electrode; passing the sized fibers by a high voltage electrode; and, connecting a high voltage source to the voltage electrode whereby current flows along the sized fibers from the high voltage electrode to the first grounded electrode.

The method may further comprise the step of passing the sized fibers by a second grounded electrode whereby current flows along the sized fibers from the high voltage electrode to the second grounded electrode.

The method may further comprise the step of contacting the sized fibers with the first grounded electrode and/or with the second grounded electrode.

It is, thus, an object of the present invention to provide an improved apparatus and methods for drying sized fibers by passing a current along the sized fibers which results in efficient, uniform heating and thereby drying of the fibers. This, and other objects and advantages of the present invention will be apparent from the following description, the accompanying drawings, and the appended claims.

DETAILED DESCRIPTION OF THE INVENTION

While it is to be understood that the present invention is generally applicable to drying a wide variety of fibers, it will be described herein with reference to in-line drying of glass fibers as they are being made, the application to which it is being applied initially. It is also noted that the invention can be used to dry sized fibers which were previously produced and packaged by winding, chopping or otherwise wherein the sized fibers are drawn from their package for drying or electrodes are inserted into the fibers for drying.

Figure 1:
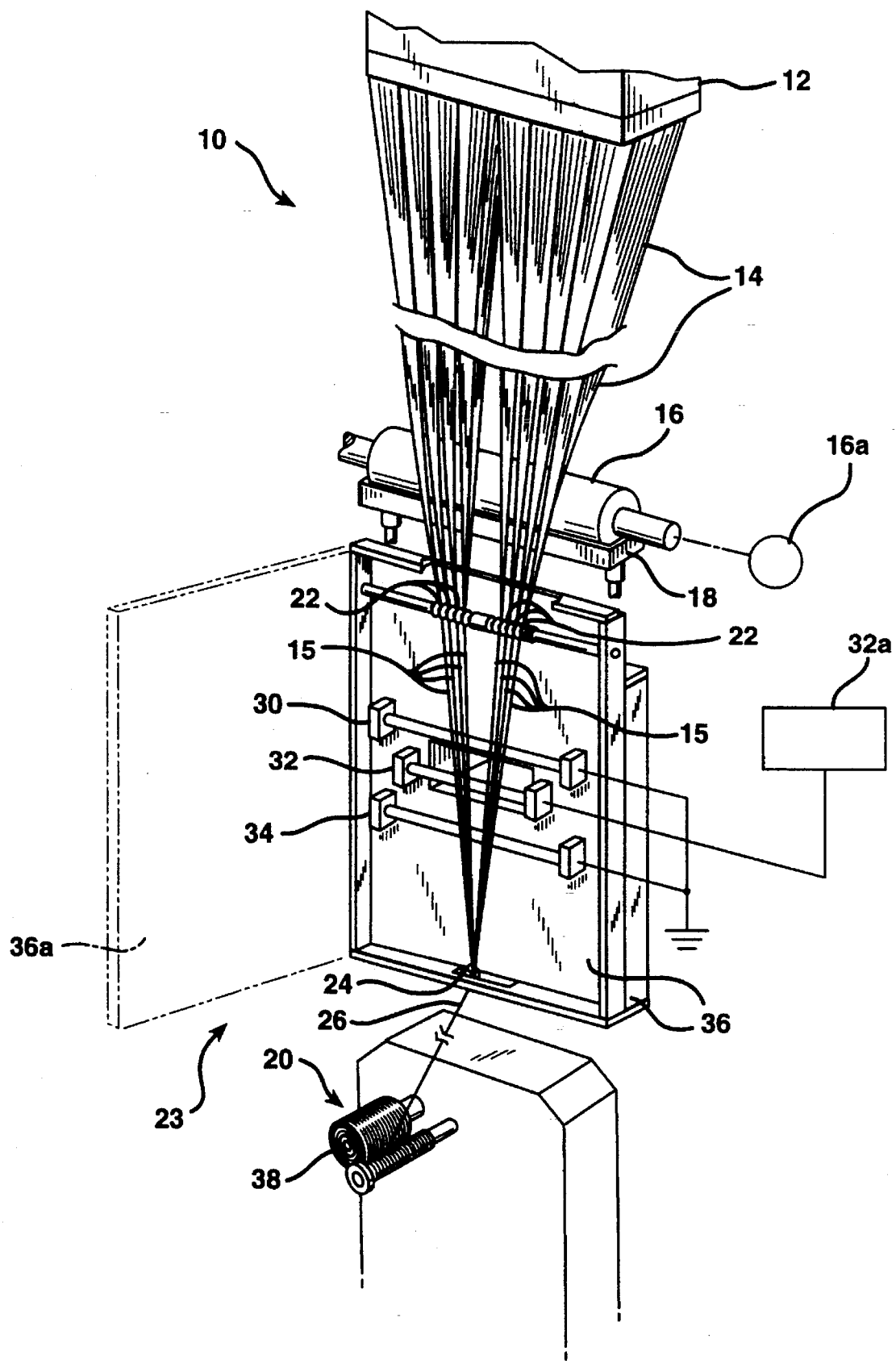
FIG. 1 is a perspective view of a glass fiber package forming apparatus including a first embodiment of the present invention.
Figure 2:
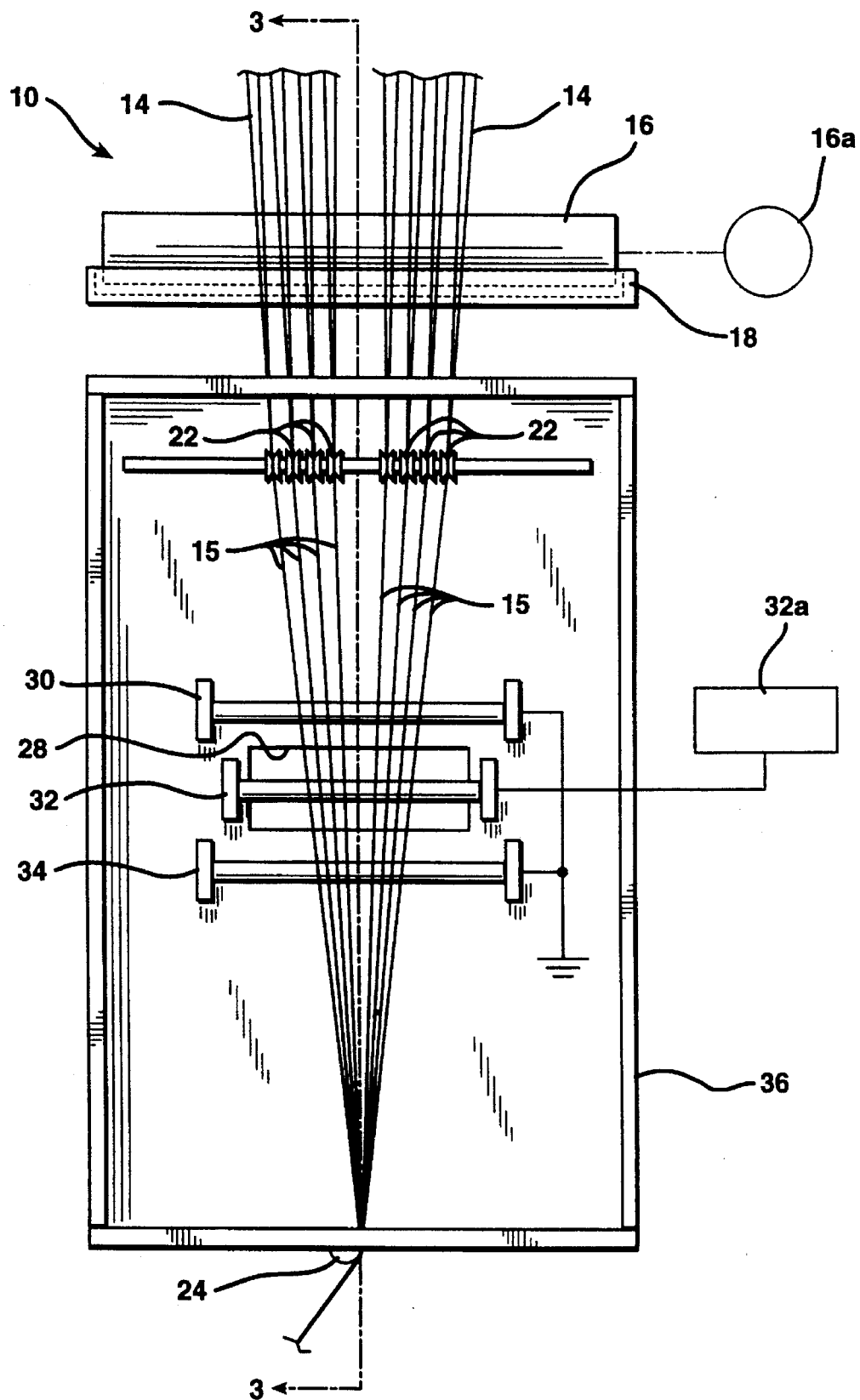
FIG. 2 is a front view of the apparatus illustrated in FIG. 1 on an enlarged scale.
Figure 3:
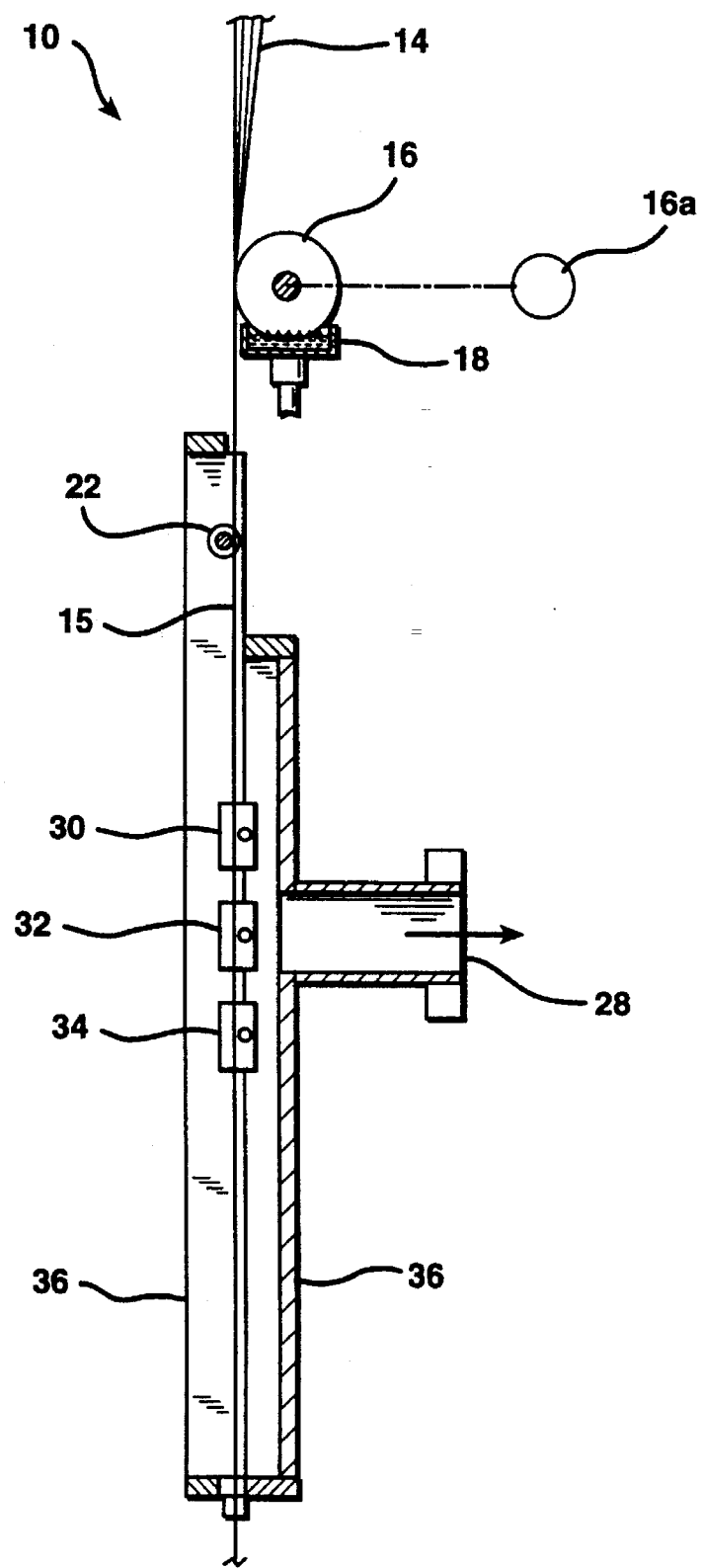
FIG. 3 is a side view of the apparatus illustrated in FIG. 2.

A first illustrative embodiment of an apparatus for sizing glass fibers in accordance with the present invention is shown in FIGS. 1–3, and is generally designated by the reference numeral 10. The apparatus 10 comprises a bushing 12 having a number of orifices (not shown) through which a plurality of streams of molten glass are discharged. The streams of glass are mechanically drawn to form continuous fibers 14 via a drawing device illustrated as a rotatable member or winder device 20 in FIG. 1. The term "continuous fiber" or "continuous fibers" as used herein encompasses also continuous strands for example with reference to natural and other fibers which are formed into strands but are not truly made up of continuous fibers per se.

The fibers 14 pass over an applicator roller 16 which applies a liquid coating of sizing composition (also referred to herein as size) to the fibers 14. Sizing compositions are typically aqueous based, but may be of any other suitable type. Suitable sizing compositions may comprise water; a film former; one or more coupling agents, such as silane coupling agents which are commercially available from OSI Industries under the product names A1100 and A174; one or more lubricants such as a fatty acid ester which is commercially available from the Stepan Co. under the product name KESSCO BES, and an amine lubricant which is commercially available from the Henkel Corporation under the product name Emery 6760U; a wetting agent, an example of which is commercially available from Rhone-Poulenc under the product name Igepal CA630; an antistatic agent, an example of which is commercially available from PPG Specialty Chemical under the product name Larostat 264A; and an acetic acid. Preferably, the film former comprises a mixture of a crosslinking vinyl acrylic copolymer emulsion, which is commercially available from Franklin International under the product name Covinax 27A, a vinyl acetate copolymer emulsion, which is commercially available from Franklin International under the product name Duracet 1512, and a polyvinyl acetate copolymer latex, which is commercially available from Franklin International under the product name Duracet 675-01.

A trough 18 containing the sizing composition is positioned below the roller 16. The roller 16 extends into the trough 18 and, as it is rotated by a conventional drive device such as a motor 16a, transfers sizing composition from the trough 18 to the fibers 14. Other suitable devices or techniques for applying size to the glass fibers 14 may also be used in place of the applicator roller 16.

As illustrated in FIGS. 1–2, the sized fibers 14 are split into discrete bundles of fibers 15 by gathering shoes 22. From the shoes 22, the fibers 15 are passed through a drying device 23 of the present invention which includes a first grounded electrode 30, a high voltage electrode 32, and a second grounded electrode 34. It should be noted that while the embodiment illustrated in FIGS. 1–3 includes two grounded electrodes, the present invention may also be practiced using only one grounded electrode, e.g., either the first grounded electrode 30 or the second grounded electrode 34.

The high voltage electrode 32 is connected to a high voltage source 32a which preferably supplies a voltage of from 5 to 50 kilovolts to the high voltage electrode 32. The voltage source 32a can be selected from a wide variety of commercially available designs or custom designs can be readily provided by those skilled in the art. The voltage source 32a can provide ac or dc power with dc power being preferred. Although the fibers 15 may directly contact the first and second grounded electrodes 30, 34, it is preferred that the fibers 15 be spaced approximately ⅛ inch from all three electrodes 30, 32, 34 as shown in FIG. 3.

The high voltage electrode 32 is preferably spaced from grounded electrodes 30 and 34 by at least one inch per 10,000 volts of the maximum voltage to be provided by the voltage source 32a to prevent arcing between the electrodes when no fibers are present and a high voltage is applied to the high voltage electrode 32. As the sized fibers 15 pass by grounded electrodes 30 and 34 and high voltage electrode 32, a sufficiently low resistance path is established such that current flows along the sized fibers 15 from the high voltage electrode 32 to the grounded electrodes 30 and 34. Because of the short distance from the electrodes 30, 32, 34 and the fibers, current arcs over to the sized fibers 15. The current then flows along the sized fibers 15 to thereby heat and dry the sizing on the fibers 15.

As shown, the electrodes 30, 32 and 34 are enclosed within an insulating housing 36 preferably constructed from a polycarbonate offered, for example, under the trademark Lexan by GE Plastics. As shown in FIG. 1, the housing 36 may include a hinged door 36a, which may be closed during the application of high voltage to the high voltage electrode 32. For safety, the door 36a may include a safety switch (not shown) for enabling the high voltage source 32a. The drying device 23 also preferably includes an exhaust 28, as best shown in FIG. 3, from which vapors produced by the drying operation are withdrawn from the housing 36.

After passing through the drying device 23, the bundles of fibers 15 are gathered together via a gathering shoe 24 to form a single tow 26 as shown in FIG. 1. From the gathering shoe 24, the tow 26 may be wound via the winder device 20 onto a collet 38 for packaging and additional processing.

It is also contemplated that the apparatus 10 may be used to produce glass fibers which are only partially dry when wound into a package. Partially drying the size applied to glass fibers, e.g., such that the package mixture content is below 6%, is believed to reduce migration in the resulting glass fiber package.

Figure 4:
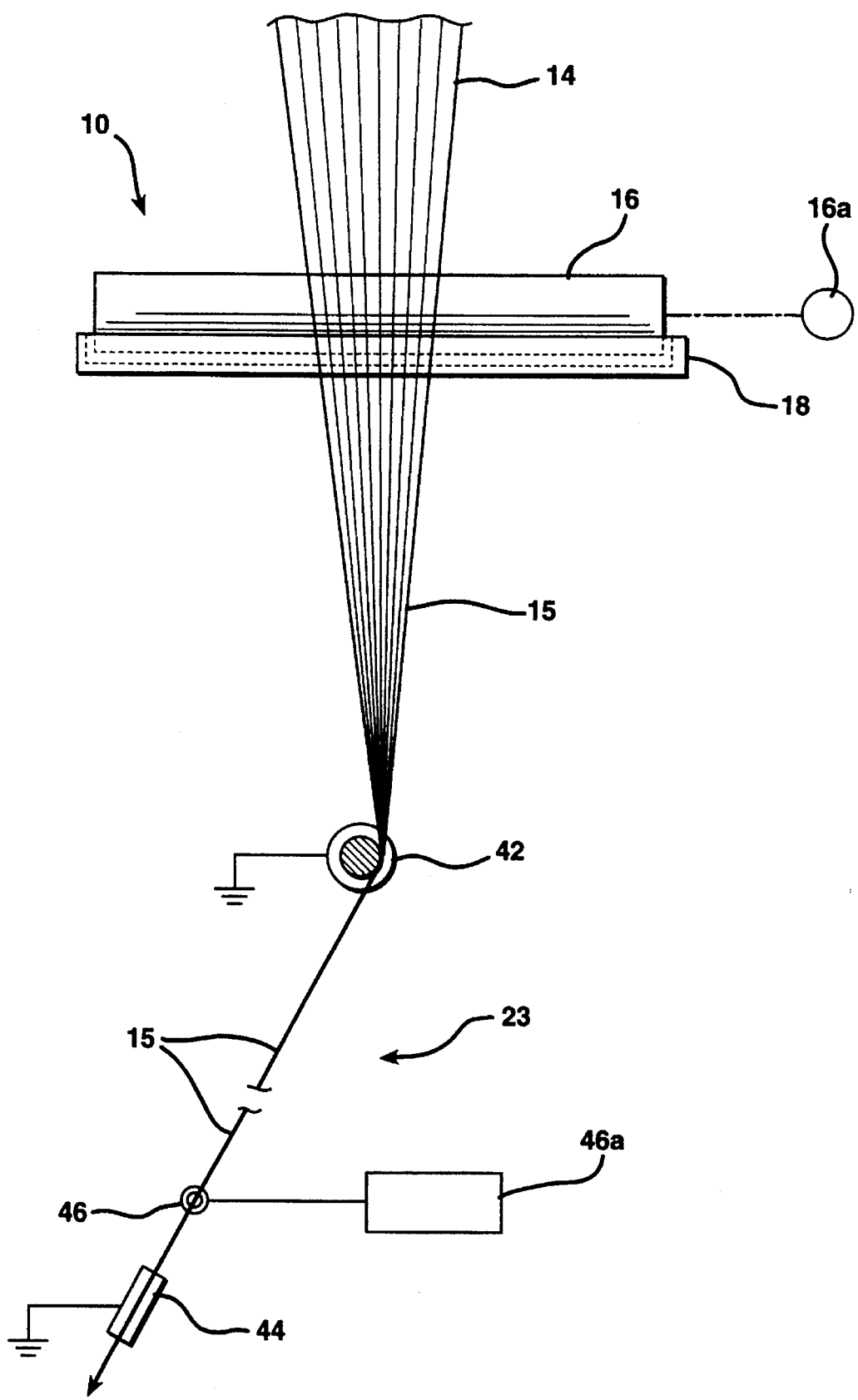
FIG. 4 is a from view of an alternative embodiment of the invention.
Figure 5:
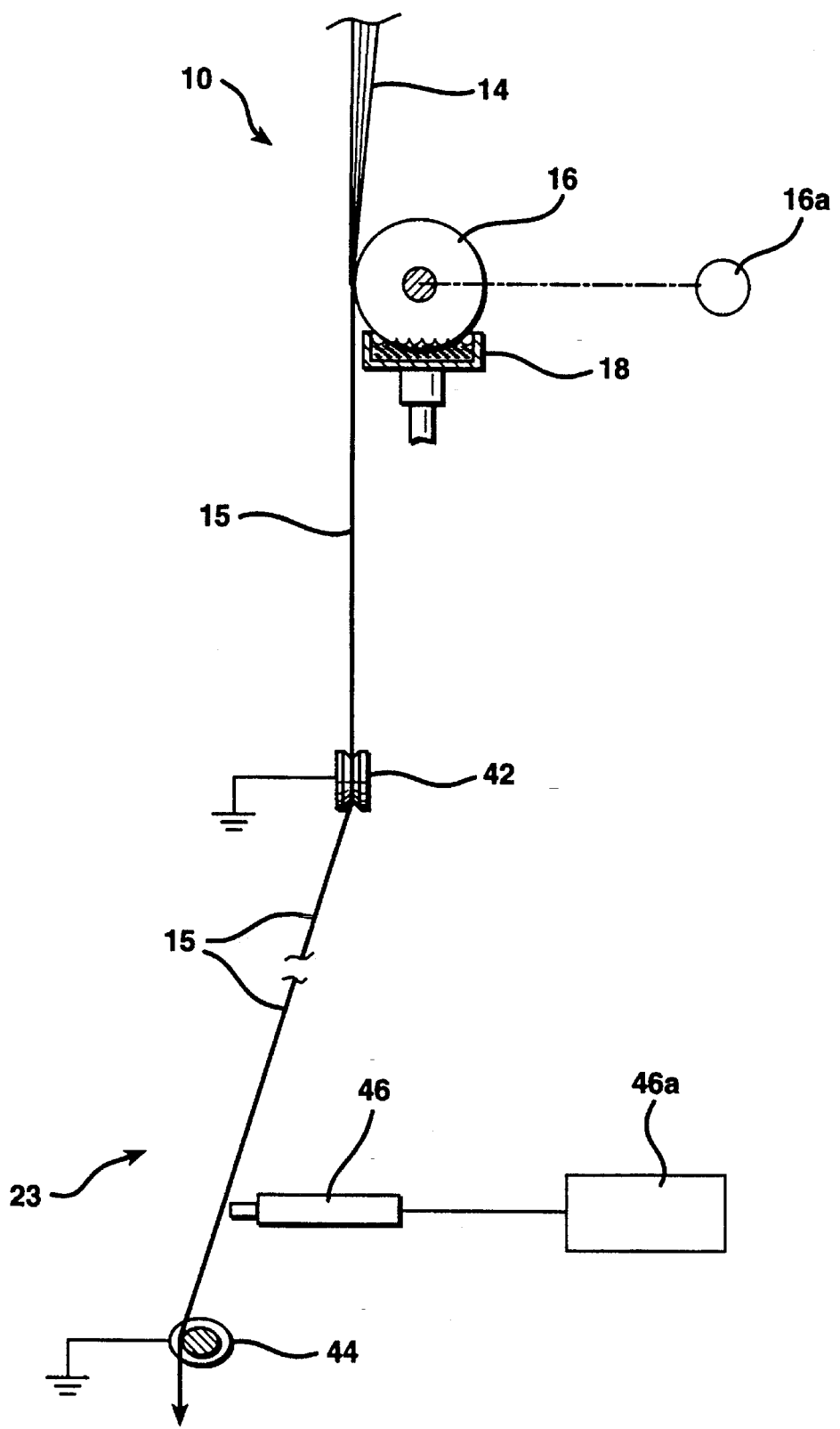
FIG. 5 is a side view of the embodiment illustrated in FIG. 4.

Referring now to FIGS. 4 and 5, where like reference numerals indicate like elements, an alternative embodiment of the invention is illustrated. In this embodiment, one or both of two gathering shoes 42 or 44 may be grounded and used to define grounded electrodes for the drying device 23. A high voltage electrode 46 is positioned adjacent the fibers 15 and driven by a high voltage source 46a. In this embodiment, when the sized fibers 15 pass through the gathering shoes 42 and 44, current arcs to the sized fibers 15 from the high voltage electrode 46, and flows along the sized fibers 15 from the high voltage electrode 46 to the grounded gathering shoes 42 and 44.

Having described the invention in detail and by reference to preferred embodiments thereof, it will be apparent that modifications and variations are possible without departing from the scope of the invention defined in the appended claims.

I claim:

1. An apparatus for sizing fibers comprising:

a source of continuous fibers;

an applicator for applying a size to said fibers to form sized fibers;

a winder for winding said sized fibers into a package; and a drying device for producing current flow along said sized fibers to generate heat therein and thereby at least partially dry said size on said sized fibers, wherein said drying device comprises a high-voltage electrode connected to a high-voltage source and at least one grounded electrode, said high-voltage electrode and said at least one grounded electrode being located between said applicator and said winder.

2. An apparatus as defined in claim 1, wherein said high-voltage electrode and said at least one grounded electrode are spaced from one another by at least one inch per 10,000 volts.

3. An apparatus as defined in claim 1, wherein said at least one grounded electrode comprises a first grounded electrode and a second grounded electrode, and said high-voltage electrode is located between said first grounded electrode and said second grounded electrode.

4. An apparatus as defined in claim 1, wherein said source of continuous fibers comprises a bushing for forming continuous glass fibers.

5. An apparatus as defined in claim 4, further comprising:

a gathering shoe between said applicator and said drying device for gathering said sized fibers into bundles; and a gathering shoe between said drying device and said winder for gathering said bundles into a tow.

6. An apparatus as defined in claim 1, wherein said drying device further comprises an insulative housing enclosing said at least one grounded electrode and said high-voltage electrode.

7. An apparatus as defined in claim 4, wherein said at least one grounded electrode comprises a first grounded gathering shoe for gathering said sized fibers into bundles and a second grounded gathering shoe for gathering said bundles into a tow.

8. An apparatus as defined in claim 4, wherein said high-voltage source comprises a power supply of from 5 to 50 kilovolts of direct or alternating current to said high-voltage electrode.

9. An apparatus as defined in claim 1, wherein said high-voltage source comprises a power supply of direct current.

10. An apparatus as defined in claim 1, wherein said at least one grounded electrode comprises a grounded gathering shoe.

11. An apparatus as defined in claim 1, wherein said applicator comprises a roller and a motor for driving said roller.

12. An apparatus as defined in claim 11, further comprising a trough under said roller for supplying said size.

13. A method for sizing fibers comprising:

applying a size to continuous fibers to form sized fibers;

drying said size on said sized fibers at least partially by producing current flow along said sized fibers to generate heat therein and form dried sized fibers, wherein said current flow is produced by passing said sized fibers by or in contact with at least one grounded electrode and by or in contact with a high-voltage electrode connected to a high-voltage source; and winding said dried sized fibers to form a package.

14. A method as defined in claim 13, wherein said at least one grounded electrode comprises a first grounded electrode and a second grounded electrode, and said high-voltage electrode is located between said first grounded electrode and said second grounded electrode.

15. A method as defined in claim 14, wherein said high-voltage electrode is spaced from each of said first grounded electrode and said second grounded electrode by at least one inch per 10,000 volts.

16. A method as defined in claim 13, further comprising drawing said continuous fibers from a bushing, wherein said fibers are glass fibers.

17. A method as defined in claim 16, further comprising:

gathering said sized fibers into bundles before said drying; and gathering said bundles into a tow after said drying and before said winding.

18. A method as defined in claim 17, wherein said winding comprises winding said tow onto a collet.

19. A method as defined in claim 16, further comprising gathering said sized fibers using said at least one grounded electrode.

20. A method as defined in claim 16, wherein said at least one grounded electrode comprises a first grounded gathering shoe and a second grounded gathering shoe, the method further comprising gathering said sized fibers into bundles with said first grounded gathering shoe and gathering said bundles into a tow with said second grounded gathering shoe.

21. A method as defined in claim 16, wherein said high-voltage source supplies from 5 to 50 kilovolts of direct or alternating current to said high-voltage electrode.

22. A method as defined in claim 13, wherein said high-voltage source supplies direct current to said high-voltage electrode.

23. A method as defined in claim 13, wherein said passing comprises contacting said sized glass fibers with said at least one grounded electrode and with said high-voltage electrode.

24. A method as defined in claim 13, wherein said fibers are glass fibers and said size comprises a film former selected from the group consisting of vinyl acrylic copolymer emulsions, vinyl acetate copolymer emulsions, polyvinyl acetate copolymer latexes, and mixtures thereof.

25. A method as defined in claim 13, wherein said continuous fibers comprise glass, graphite, polymer, or natural fibers.

* * * * *